INVENTOR.
MICHAEL P. ALEXANDER
BY
HIS ATTORNEY

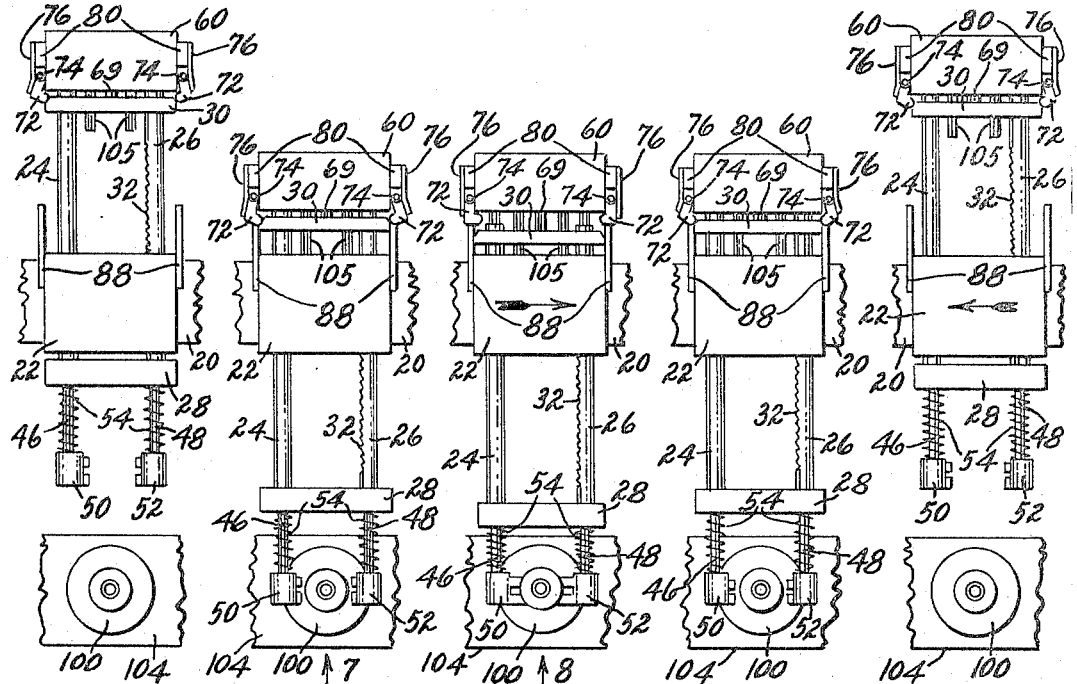
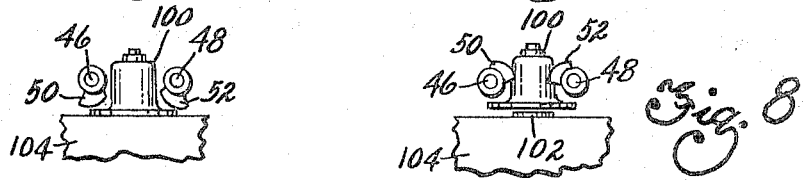
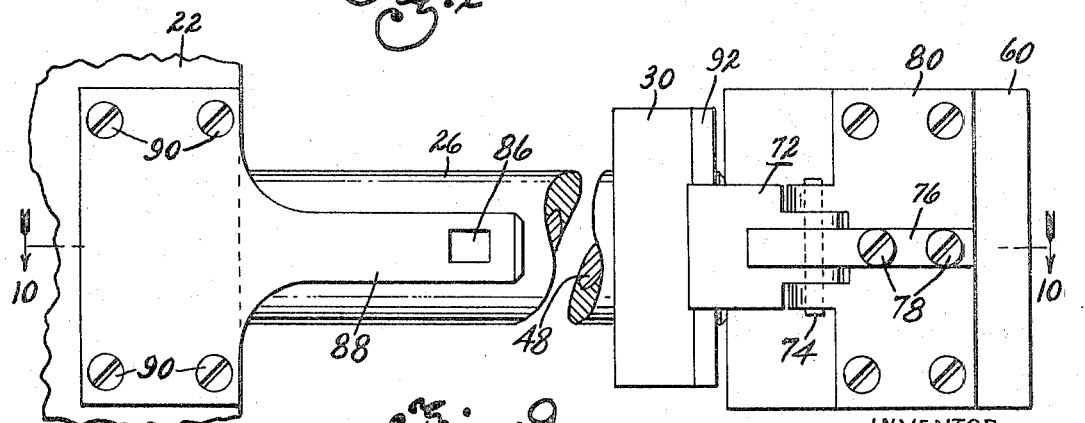

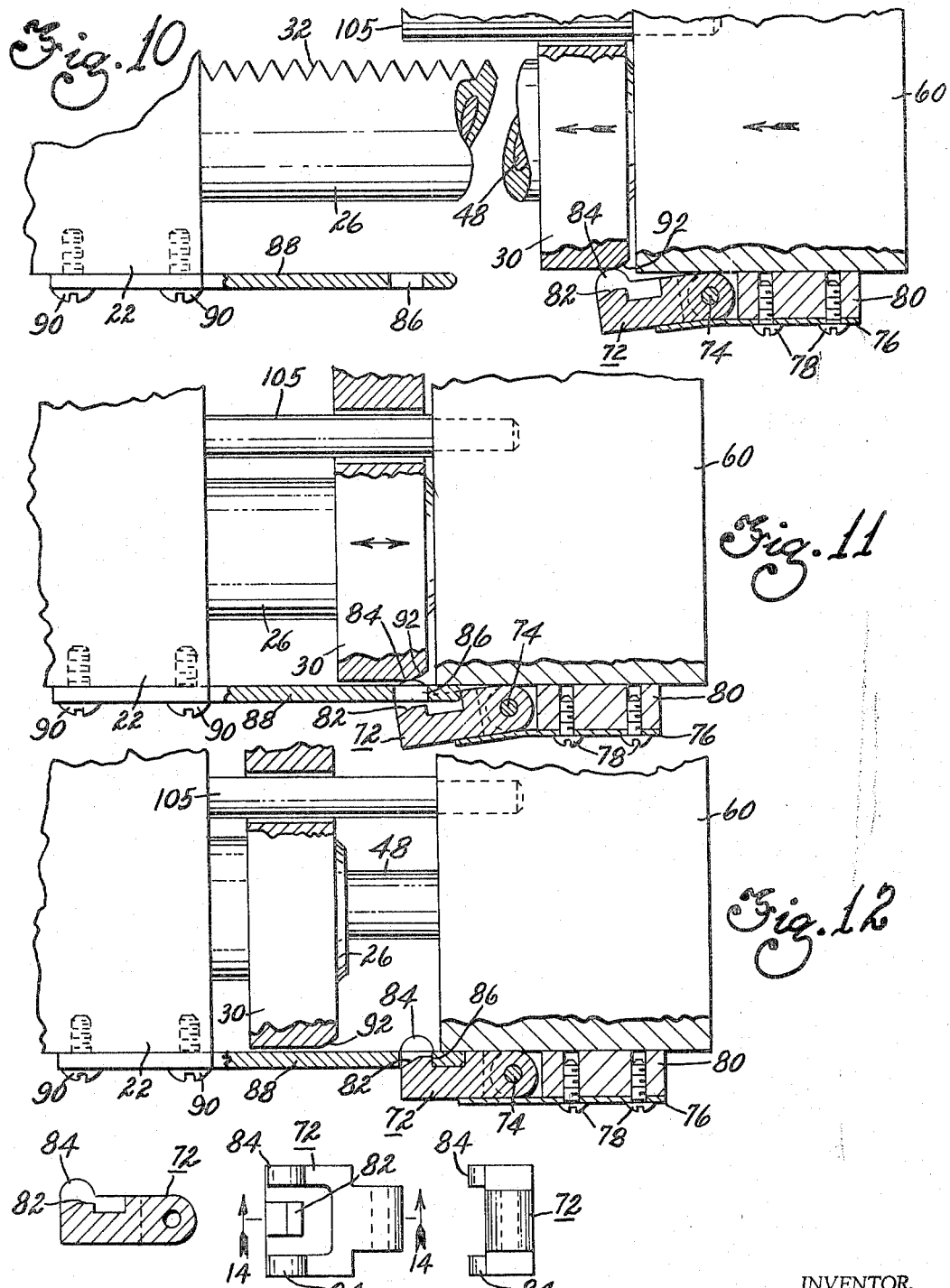

3,295,701
ARTICLE TRANSFER MECHANISM
Michael P. Alexander, Rochester, N.Y., assignor to General Motors Corporation, Detroit, Mich., a corporation of Delaware
Filed Jan. 13, 1965, Ser. No. 425,149
8 Claims. (Cl. 214—1)

This invention pertains to article transfer mechanisms, and particularly to a pickup and release mechanism adapted for use in progressive die forming apparatus.

In progressive die forming operations such as used in the manufacture of cup-shaped steel electric motor casings, it is necesary to remove the die formed case halves from the dies and transfer the case halves to another work station for subsequent machining and/or forming operations. Heretofore, the transfer mechanism has comprised a pair of channel bars for each case half, which channel bars were reciprocated to clamp the case half so as to lift its respective case half off the die. It has been found that in the prior transfer mechanism the channel bars were either bent during the clamping action or caused the case halves to twist, which is objectionable, due to unequal pressures of the channel bars on opposite sides of each case half.

The present invention relates to an improved article transfer mechanism including a pair of oscillatable finger rods adapted to pick up each case half after which the entire mechanism is moved transversely to a release station where the finger rods are rotated in the opposite direction to release the case halves in the exact location required for the die tooling, after which the transfer mechanism is returned to the pickup station. Accordingly, among my objects are the provision of an improved article transfer mechanism including a pair of oscillatable finger rods adapted to clamp a cylindrical piece part; the further provision of an article transfer mechanism wherein the finger rods are carried by reciprocable support tubes; the still further provision of article transfer mechanism of the aforesaid type including drive means for sequentially reciprocating the tubes to extend the finger rods and thereafter rotate the finger rods to clamp the cylindrical piece part.

The aforementioned and other objects are accomplished in the present invention by rotatably supporting the finger rods within the reciprocating tubes and utilizing rack and gear mechanism to sequentially advance the tubes and finger rods, oscillate the finger rods to pick up the article, and after transfer to a subsequent work station oscillate the finger rods in the opposite direction to release the articles and thereafter reciprocate the finger rods and tubes to retract the mechanism and return it to the original pickup station.

Further objects and advantages of the present invention will be apparent from the following description, reference being had to the accompanying drawings wherein a preferred embodiment of the present invention is clearly shown, and wherein similar numerals depict similar parts throughout the several views.

In the drawings:

FIGURES 2 through 6 are schematic views illustrating the sequence of steps in picking up, transferring and releasing an article;

Figure 1:
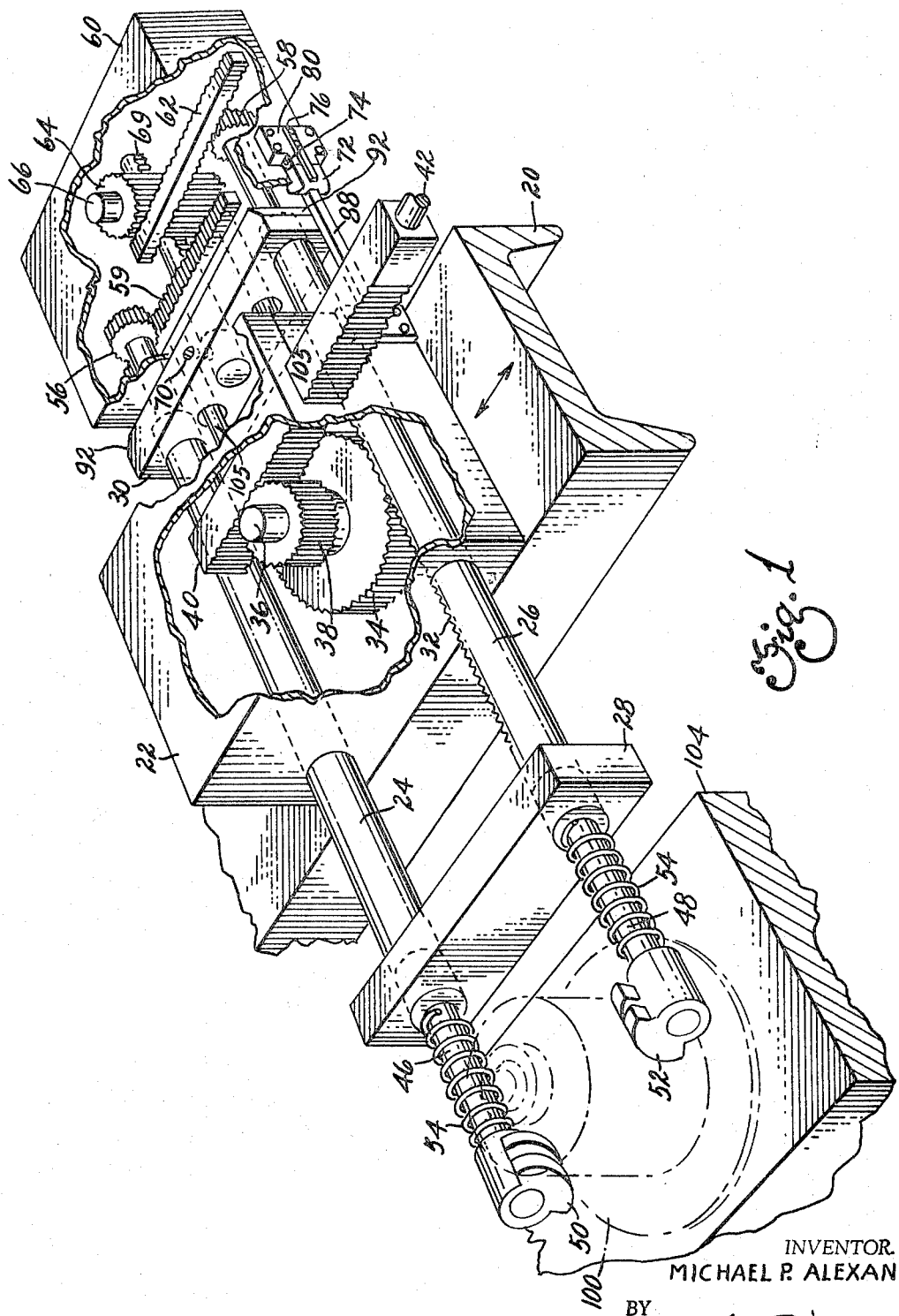
FIGURE 1 is a perspective view, partly in section and partly in elevation, with certain parts broken away, depicting the improved transfer mechanism constructed according to my invention.

FIGURES 7 and 8 are fragmentary views in elevation taken in the direction of arrows 7 and 8 of FIGURES 3 and 4 respectively;

FIGURE 9 is a fragmentary side view in elevation depicting the latch mechanism;

FIGURES 10, 11 and 12 are fragmentary sectional views taken generally along line 10 of FIGURE 9, depicting operation of the latch mechanism;

FIGURE 13 is a plan view of one of the latch members;

FIGURE 14 is a sectional view taken along line 14—14 in FIGURE 13; and

FIGURE 15 is an end view of the latch member.

Referring to FIGURE 1, the article transfer mechanism is mounted on a reciprocable channel bar 20, and comprises a support member 22 having a pair of parallel, reciprocable tubes 24 and 26 slidably mounted therein and extending therethrough. It is to be understood, of course, that the transfer mechanism may embody a plurality of support members and associated tube structure which are concurrently actuated to pick up, transfer and release a plurality of similar work pieces, or articles, that the disclosed embodiment depicting only a single article transfer mechanism is only exemplary.

The tubes 24 and 26 have a bar 28 attached thereto adjacent their outer ends and a second bar 30 attached thereto adjacent their inner ends. The tube 26 is formed with a toothed rack 32 that engages a pinion 34 attached to a shaft 36 rotatably journalled in the support 22 by suitable bearing means, not shown. The shaft 36 has a second pinion 38 attached thereto that engages a second rack 40 which extends transversely of the rack 32 and is slidably mounted within the support 22. The rack 40 is attached to a rod 42 which is reciprocated by the transfer mechanism of the press.

The tubes 24 and 26 support a pair of rotatably finger rods 46 and 48 having eccentric fingers 50 and 52 attached to their outer ends. A coil spring 54 encircles each of the rods 46 and 48 and is confined between its respective finger and the bar 28. The rods 46 and 48 extend from both ends of their respective tubes 24 and 26, and as shown in FIGURE 1, the rod 46 has a pinion 56 attached to its inner end and the rod 48 has a pinion 58 attached to its inner end. The pinion 56 meshes with a rack 59 mounted within a retainer plate support 60 and the pinion 58 meshes with a rack 62 reciprocally mounted within the support 60, both of the racks 59 and 62 having toothed surfaces on adjacent edges so as to mesh not only with their respective pinions 56 and 58, but also with an elongate pinion 64 rotatably supported on a shaft 66 carried by the support 60. The elongate pinion 64 meshes with a third rack 69 reciprocally supported within the support 60 and attached to the bar 30 by a set screw 70.

Referring to FIGURES 9 through 15, the retainer plate support 60 has a pair of latch members 72 pivotally supported on opposite edge surfaces by pins 74 and baised inwardly by leaf springs 76 attached by screws 78 to a bracket 80 which is suitably attached to the retainer plate support 60. As seen particularly in FIGURES 13 through 15, each latch member 72 is formed with an upstanding abutment 82 disposed between a pair of spaced cam surfaces 84. The abutments 82 of the latch members 72 are adapted to fit into apertures 86 on a pair of bayonet arms 88 attached to the support 22 on opposite sides thereof. The arms 88 are attached to the support structure 22 by screws 90. In addition, the plate 30 is formed with chamfered edges 92 adapted to coact with the cams 84 of the latch members 72 to release the latch members as shown in FIGURE 10.

Referring to FIGURES 2 through 8, the sequence of operation will be described. In FIGURE 2 the transfer mechanism is at the pickup station and is shown in the retracted position in alignment with a cylindrical motor case half 100 which is positioned over a die 102, shown in FIGURE 8, attached to a bolster 104. Upon actuation of the transfer mechanism the rod 42 will be retracted so as to move the rack 40 outwardly of the support structure 22 to rotate the pinion 38 in the clockwise direction, as seen in FIGURE 1. Clockwise rotation of the pinion 38 and the pinion 34 will extend the tube 24 and the tube 26. The extending movement of the tubes 24 and 26 will be imparted to the rods 46 and 48 through the springs 54, and will likewise be imparted to the retainer plate support structure 60 through the rods 46 and 48 which are journalled therein and restrained against axial movement relative thereto. During conjoint movement of the rods 46, 48, the tubes 24, 26, the plates 28 and 30, and the retainer plate support structure 60, the elongate pinion 64 will not be rotated since the rack 69 and the pinion 64 are moving together.

When the tubes 24 and 26 with their rods 46 and 48 are fully extended in the position shown in FIGURE 3, pins 105, attached to the structure 60, will abut the support member 22, as shown in FIGURE 11, thereby arresting further movement of the retainer plate support structure 60. Accordingly, continued retraction of the rod 42 with its rack 40 will result in continued extending movement of the tubes 24 and 26 relative to the rods 46 and 48. Since the plate 30 moves with the tubes 24 and 26, the rack 69 will move relative to the pinion 64 so as to rotate the pinion 64. Rotation of the pinion 64 will impart reciprocation to the racks 59 and 62 so as to rotate the gears 56 and 58 and hence rotate the rods 46 and 48 so as to rotate the eccentric fingers 50 and 52. The finger 50 will rotate in the counterclockwise direction and the finger 52 will rotate in the clockwise direction substantially 90°, as seen in FIGURES 7 and 8, to clamp and lift the case half 100 as shown in FIGURE 8. During relative movement between the plate 30 and the retainer support structure 60 the abutment 82 on each latch member 72 will be engaged with the aperture 86 on its respective bayonet arm 88 as seen in FIGURE 12. Likewise, during extension of the tubes relative to the rods, the springs 54 will be compressed.

Thereafter, the entire transfer mechanism is moved transversely from the pickup station to the release station as shown in FIGURE 5, by any suitable means, not shown. At the release station, the transfer mechanism will be extended thereby extending the rod 42 and the rack 40 so as to impart counterclockwise rotation to the pinions 38 and 34, as seen in FIGURE 1. Initial retraction of the tubes 24 and 26 will cause the plate 30 to move relative to the retainer plate support structure 60 whereby rotating the rods 46 and 48 in the opposite direction to release the fingers 50 and 52 from the case half 100, and thus release the case half. When the plate 30 reaches the position shown in FIGURE 11, the chamfered surfaces 92 will release the latch members 72 which hold the structure 60 in its fully extended position until fingers 50 and 52 release case half 100. Thereafter, the abutments on the latch members 72 will be released by cam surfaces 84 thereon so that during continued extension of the piston and cylinder assembly 44, the retainer plate support structure 60 will be retracted with the tubes 24 and 26, due to engagement of the ends of tubes 24 and 26 therewith, as will the rods 46 and 48. The fully retracted position of the transfer mechanism is shown in FIGURE 6, after which it is moved from the release station back to the pickup station by the transfer mechanism.

While the embodiment of the present invention as herein disclosed constitutes a preferred form, it is to be understood that other forms might be adopted.

What is claimed is as follows:

1. Mechanism for transferring a cylindrical article between successive work stations including, a pair of reciprocable tubes disposed on opposite sides of a cylindrical article, at least one of said tubes having a rack portion formed in a segmented area thereof, a pair of rods rotatably supported in said tubes, finger means attached to the end of each rod, gear means operably engaging said rack portion to lineally extend said tubes and said rods to position said finger means diametrically relative to said cylindrical article, means operable to rotate said rods to cause said finger means to clamp said cylindrical article therebetween, means operable to move said tubes, rods and said article transversely from a first work station to a second work station, and means operable to rotate said rods in the opposite direction so that said finger means release said cylindrical article.

2. Mechanism for transferring a cylindrical article between successive work stations including, a pair of reciprocable tubes disposed on opposite sides of a cylindrical article, a pair of rods rotatably journaled within said tubes, eccentric finger means attached to each rod adjacent its outer end, means operable to impart conjoint linear extending movement to said tubes and said rods to position said finger means diametrically relative to said cylindrical article, means operable to arrest reciprocation of said rods during continued extension of said tubes and concurrently rotate said rods to cause said eccentric finger means to clamp the cylindrical article therebetween, means operable to move said rods, tubes and article transversely from a first work station to a second work station, means operable to retract said tubes and concurrently rotate said rods in the opposite direction to release said article at said second work station, and means operable to concurrently retract said tubes and said rods after release of said article.

3. The mechanism set forth in claim 2 including a pair of plates interconnecting said tubes adjacent their ends, and a pair of coil springs encircling said rods and confined between one of said plates and said finger means for imparting extending movement to said rods during extension of said tubes.

4. The mechanism set forth in claim 3 wherein said tubes are slidably mounted in a support member with said plates being disposed on opposite sides of said support member.

5. The mechanism set forth in claim 4 wherein said rods are rotatably journaled and restrained against axial movement in a retainer plate support carried by said support member.

6. The mechanism set forth in claim 5 wherein the means for imparting conjoint extending movement to said tubes and rods comprises a pinion rotatably supported in said support member and a rack integral with one of said tubes and engaging said pinion.

7. The mechanism set forth in claim 6 including means for arresting movement of said retainer plate support relative to said support member when said rods are fully extended, and rack and pinion means coacting with said rods and effecting rotation of said rods during continued extending movement of said tubes.

8. The mechanism set forth in claim 7 wherein said last recited means comprises a pair of pivotally mounted latch members carried by said retainer plate support and engageable with bayonet arms attached to said support member.

References Cited by the Examiner
UNITED STATES PATENTS

| | | |
|---|---|---|
| 2,736,909 | 3/1956 | Hatebur. |
| 2,934,218 | 4/1960 | Peras. |
| 3,077,259 | 2/1963 | Braun _____ 198—218 |
| 3,222,715 | 12/1965 | Harris _____ 214—1 X |

MARVIN A. CHAMPION, *Primary Examiner*,